(12) United States Patent
Nias et al.

(10) Patent No.: US 9,022,683 B2
(45) Date of Patent: May 5, 2015

(54) TOLERANCE RING WITH SLOTTED SIDEWALL

(71) Applicants: Benjamin Nias, Patchway (GB); Andrew Robert Slayne, Frampton Cotterell (GB); Simon Alan Hughes, Pembrokeshire (GB)

(72) Inventors: Benjamin Nias, Patchway (GB); Andrew Robert Slayne, Frampton Cotterell (GB); Simon Alan Hughes, Pembrokeshire (GB)

(73) Assignee: Saint-Gobain Performance Plastics Rencol Limited, Saint-Gobain House, Binley Business Park, Coventry ( * ) Notice: Subject to any disclaimer, the term of this patent is extended or adjusted under 35 U.S.C. 154(b) by 0 days.

(21) Appl. No.: 13/874,443

(22) Filed: Apr. 30, 2013

(65) Prior Publication Data

US 2013/0315655 A1    Nov. 28, 2013

Related U.S. Application Data

(60) Provisional application No. 61/640,626, filed on Apr. 30, 2012.

(51) Int. Cl.
| | |
|---|---|
| *F16C 27/00* | (2006.01) |
| *F16C 11/04* | (2006.01) |
| *F16D 1/08* | (2006.01) |
| *G11B 5/48* | (2006.01) |

(Continued)

(52) U.S. Cl.
CPC .............. *F16C 11/04* (2013.01); *F16D 1/0835* (2013.01); *G11B 5/4813* (2013.01); *G11B 5/5569* (2013.01); *F16C 27/02* (2013.01)

(58) Field of Classification Search
CPC .... F16C 2326/24; F16C 27/02; F16C 35/077; F16C 35/073; F16C 2370/12; B62D 1/16; F16D 1/0835; G11B 5/4813
USPC .................. 403/367, 371, 372; 411/520, 521; 384/535, 581; 360/97.02, 265.2, 265.6, 360/266.1
See application file for complete search history.

(56) References Cited

U.S. PATENT DOCUMENTS

| | | | |
|---|---|---|---|
| 791,059 A | 5/1905 | Wormer | |
| 2,348,862 A | 5/1944 | Sorkin | |

(Continued)

FOREIGN PATENT DOCUMENTS

| | | |
|---|---|---|
| CA | 2736810 A1 | 3/2010 |
| CN | 101583997 A | 11/2009 |

(Continued)

OTHER PUBLICATIONS

International Search Report from PCT Application No. PCT/GB2013/051116, dated Jul. 4, 2013, 1 pg.

(Continued)

*Primary Examiner* — Joshua Kennedy
(74) *Attorney, Agent, or Firm* — Chi Suk Kim; Abel Law Group, LLP

(57) ABSTRACT

A tolerance ring can include a generally cylindrical body having a sidewall. The sidewall can include a plurality of wave structures extending from the sidewall at regular intervals around the body, a first unformed section between a first pair of adjacent wave structures, and a second unformed section between a second pair of adjacent wave structures. The gap can extend along an entire length, L, of the body to establish a split in the body. The second unformed section can include a slot therein. The slot can have a length, $L_S$, and $L_S \geq 80\%$ L.

19 Claims, 12 Drawing Sheets

(51) Int. Cl.
*G11B 5/55* (2006.01)
*F16C 27/02* (2006.01)

(56) References Cited

U.S. PATENT DOCUMENTS

| | | | |
|---|---|---|---|
| 2,813,765 | A | 11/1957 | Alward |
| 2,978,227 | A | 4/1961 | Hess |
| 3,420,537 | A | 1/1969 | Walters |
| 3,700,271 | A | 10/1972 | Blaurock et al. |
| 3,838,928 | A | 10/1974 | Blaurock et al. |
| 4,083,622 | A | 4/1978 | Neidecker |
| 4,286,894 | A | 9/1981 | Rongley |
| 4,384,626 | A | 5/1983 | Derouin |
| 4,848,935 | A | 7/1989 | Seibig et al. |
| 4,981,390 | A | 1/1991 | Cramer, Jr. et al. |
| 5,125,755 | A | 6/1992 | Adler et al. |
| 5,575,691 | A | 11/1996 | Matthews |
| 5,704,762 | A | 1/1998 | Schultze |
| 6,179,473 | B1 | 1/2001 | Ponson et al. |
| 6,416,229 | B1 | 7/2002 | Wolf |
| 6,846,110 | B2 | 1/2005 | Lutz et al. |
| 7,583,476 | B2 | 9/2009 | Hanrahan et al. |
| 7,850,389 | B2 | 12/2010 | Hanrahan et al. |
| 7,978,437 | B2 | 7/2011 | Hanrahan et al. |
| 8,157,450 | B2 | 4/2012 | Hosmer et al. |
| 8,282,308 | B2 * | 10/2012 | Slayne et al. ............... 403/372 |
| 8,385,024 | B2 | 2/2013 | Schmidt et al. |
| 2006/0012133 | A1 | 1/2006 | Strait |
| 2006/0012134 | A1 | 1/2006 | Rode et al. |
| 2007/0096588 | A1 | 5/2007 | Kirchner |
| 2007/0274772 | A1 | 11/2007 | Tiberghien et al. |
| 2008/0029356 | A1 | 2/2008 | Halasy-Wimmer et al. |
| 2008/0043374 | A1 | 2/2008 | Hanrahan et al. |
| 2008/0049362 | A1 | 2/2008 | Hanrahan et al. |
| 2009/0064536 | A1 | 3/2009 | Klassen et al. |
| 2009/0258714 | A1 | 10/2009 | Rode et al. |
| 2009/0258715 | A1 | 10/2009 | Rode et al. |
| 2009/0296282 | A1 | 12/2009 | Hanrahan et al. |
| 2010/0032577 | A1 | 2/2010 | Fruehauf et al. |
| 2010/0073820 | A1 | 3/2010 | Slayne et al. |
| 2012/0087044 | A1 * | 4/2012 | Schmidt et al. ............ 360/265.6 |
| 2013/0028732 | A1 | 1/2013 | Golovatai-Schmidt et al. |
| 2013/0315654 | A1 | 11/2013 | Nias et al. |

FOREIGN PATENT DOCUMENTS

| | | |
|---|---|---|
| DE | 3704572 A1 | 8/1988 |
| DE | 4230965 A1 | 3/1994 |
| DE | 29680093 U1 | 2/1997 |
| DE | 19922914 A1 | 11/2000 |
| DE | 102008028371 A1 | 12/2009 |
| DE | 102011077361 A1 * | 12/2012 |
| EP | 1408247 B1 | 8/2006 |
| EP | 1498911 B1 | 10/2008 |
| EP | 1985875 A1 | 10/2008 |
| EP | 2054885 B1 | 2/2011 |
| FR | 2627620 A3 | 8/1989 |
| GB | 2173867 A | 10/1986 |
| GB | 2298005 A | 8/1996 |
| GB | 2413594 A | 11/2005 |
| JP | 0392610 A | 4/1991 |
| JP | 03092610 A | 4/1991 |
| JP | 2002-130266 A | 5/2002 |
| JP | 2002-130310 A | 5/2002 |
| JP | 2012-052638 A | 3/2012 |
| RU | 2389913 C1 | 5/2010 |
| WO | 96/25607 A1 | 8/1996 |
| WO | 03/010441 A1 | 2/2003 |
| WO | 2008/021890 A2 | 2/2008 |
| WO | 2008/024687 A2 | 2/2008 |
| WO | 2009/030017 A1 | 3/2009 |
| WO | 2013164607 A1 | 11/2013 |
| WO | 2013164608 A1 | 11/2013 |

OTHER PUBLICATIONS

International Search Report from PCT Application No. PCT/GB2013/051117, dated Jul. 4, 2013, 1 pg.

U.S. Appl. No. 13/874,442, filed Apr. 30, 2013, 37 pgs.

* cited by examiner

TOLERANCE RING WITH SLOTTED SIDEWALL

This application claims priority to and the benefit of U.S. Provisional Patent Application No. 61/640,626, which was filed on Apr. 30, 2012, and is incorporated herein by reference in its entirety.

BACKGROUND OF THE INVENTION

1. Field of the Disclosure

The present disclosure is directed to tolerance rings, particularly to tolerance rings for actuator arms within hard disk drives.

2. Description of the Related Art

This disclosure relates to tolerance ring assemblies, wherein a tolerance ring provides an interference fit between parts of an assembly, in which a first part has a cylindrical portion located in a cylindrical bore of a second part. Further, this disclosure particularly relates to assemblies having a tolerance ring that provides an interference fit between a cylindrical component such as a shaft or a bearing and a housing for the shaft.

Improved engineering techniques have resulted in the need for greater accuracy of machine parts, raising manufacturing costs. Very close tolerances are required where press fits, splines, pins or keyways are employed to transmit torque in applications such as pulleys, flywheels or driveshafts.

Tolerance rings may be used to provide an interference fit between parts required to transmit torque. Tolerance rings provide a low cost means of providing an interference fit between parts that may not be machined to exact dimensions. Tolerance rings have a number of other potential advantages, such as compensating for different linear coefficients of expansion between the parts, allowing rapid apparatus assembly, and durability.

A tolerance ring generally comprises a strip of resilient material, for example a metal such as spring steel, the ends of which are brought together to form a ring. A band of protrusions extend radially outwards from the ring, or radially inwards towards the center of the ring. Usually, the protrusions are formations, possibly regular formations, such as corrugations, ridges or waves.

When the ring is located in the annular space between, for example, a shaft and a bore in a housing in which the shaft is located, the protrusions are compressed. Each protrusion acts as a spring and exerts a radial force against the shaft and the surface of the bore, providing an interference fit between the shaft and the housing. Rotation of the housing or the shaft will produce similar rotation in the other of the shaft or the housing, as torque is transmitted by the tolerance ring. Typically, the band of protrusions is axially flanked by annular regions of the ring that have no formations (known in the art as "unformed regions" of the tolerance ring).

Although tolerance rings usually comprise a strip of resilient material that is curved to allow the easy formation of a ring by overlapping the ends of the strip, a tolerance ring may also be manufactured as an annular band. The term "tolerance ring" as used hereafter includes both types of tolerance ring. The term "shaft" as used hereafter includes any assembly component with a cylindrical portion, such as a shaft or a bearing.

Accordingly, the industry continues to need improvements in tolerance rings, particularly tolerance rings installed within hard disk drives.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description is directed to tolerance rings, and particularly, to tolerance rings that can be installed within a hard disk drive between a post and a bore formed in an actuator arm. In one aspect, a tolerance ring can be fitted around the pivot and then this pivot ring assembly can be inserted into the bore. Alternatively, the tolerance ring can be inserted into the bore and the pivot can be inserted into the tolerance ring.

In a typical tolerance ring, the waves nearest to the gap tend to be the weakest, i.e., least stiff, since the waves have a gap on one side and material on the other and the remaining waves in the tolerance ring are flanked by material on both sides. This variation in stiffness can cause performance variables, e.g., resonance and alignment, to be very dependent on a position of the gap in the hard disk drive assembly. Attempting to optimize the gap location for one performance parameter can adversely affect other performance parameters. This, in turn, can compromise overall performance.

A tolerance ring according to one or more of the embodiments described herein can include a plurality of slots that extend through the sidewall of the tolerance ring at targeted locations within the unformed sections of the tolerance ring in order to impart controlled weaknesses in the sidewall adjacent to one or more waves. For example, a slot can extend along nearly the entire length of the sidewall between two adjacent wave structures to remove nearly all of the unformed section of the sidewall between the wave structures. Removing the unformed section of the sidewall between the wave structures can reduce the stiffness of the adjacent waves since the unformed section provides a strengthening base for the wave structures.

The slotted tolerance rings disclosed herein can provide a tolerance ring having a resonant frequency and stiffness that do not substantially vary circumferentially around the tolerance ring. As such, the tolerance ring can maintain the post in alignment within the bore and can substantially prevent any rocking of the post within the bore under normal operational loads in nearly any radial direction.

Figure 1:
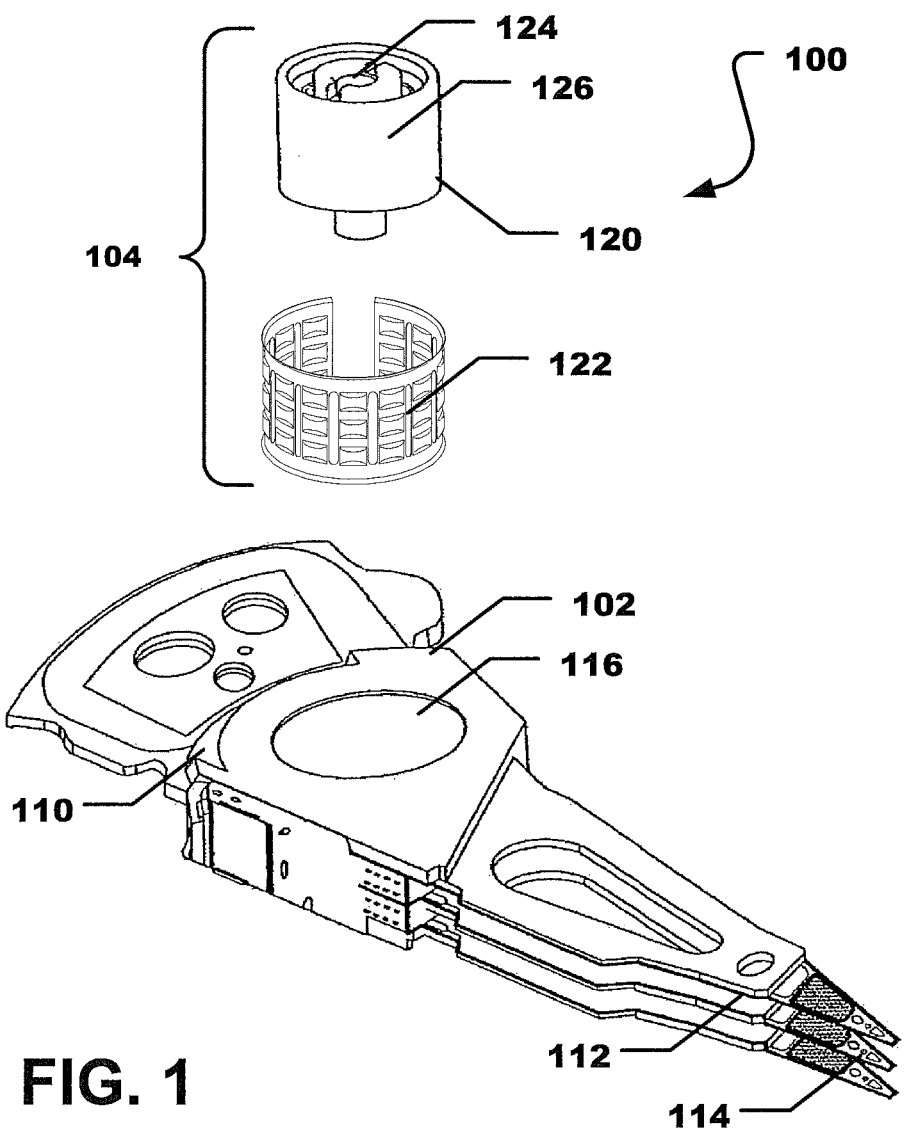
FIG. 1 includes an exploded perspective view of a hard disk drive assembly in accordance with an embodiment.

Referring initially to FIG. 1, a hard disk drive assembly is shown and is generally designated 100. The hard disk drive assembly 100 can include an actuator arm 102 for a hard disk drive and a pivot assembly 104.

As illustrated, the actuator arm 102 can include a proximal end 110 and a distal end 112. A plurality of read/write heads 114 can extend from the distal end 112 of the actuator arm 102. Moreover, the actuator arm 102 can be formed with a bore 116 near the proximal end 110 of the actuator arm 102.

FIG. 1 further indicates that the pivot assembly 104 can include a pivot 120 and a tolerance ring 122. The pivot 120 can include an inner member 124 and an outer member 126 and the outer member 126 can rotate with respect to the inner member 124.

In a particular aspect, the tolerance ring 122 can fit around the pivot 120 and then, the pivot assembly 104 can be installed within the bore 116. In another aspect, the tolerance ring 122 can be placed within the bore 116 and the pivot 120 can be inserted into the tolerance ring 122. The tolerance ring 122 can establish an interference fit between the outer member 126 of the pivot 120 and the bore 116 of the actuator arm 102. As such, the actuator arm 102 can rotate with the outer member 126 of the pivot 120 around the inner member 124 of the pivot 120.

Figure 2:
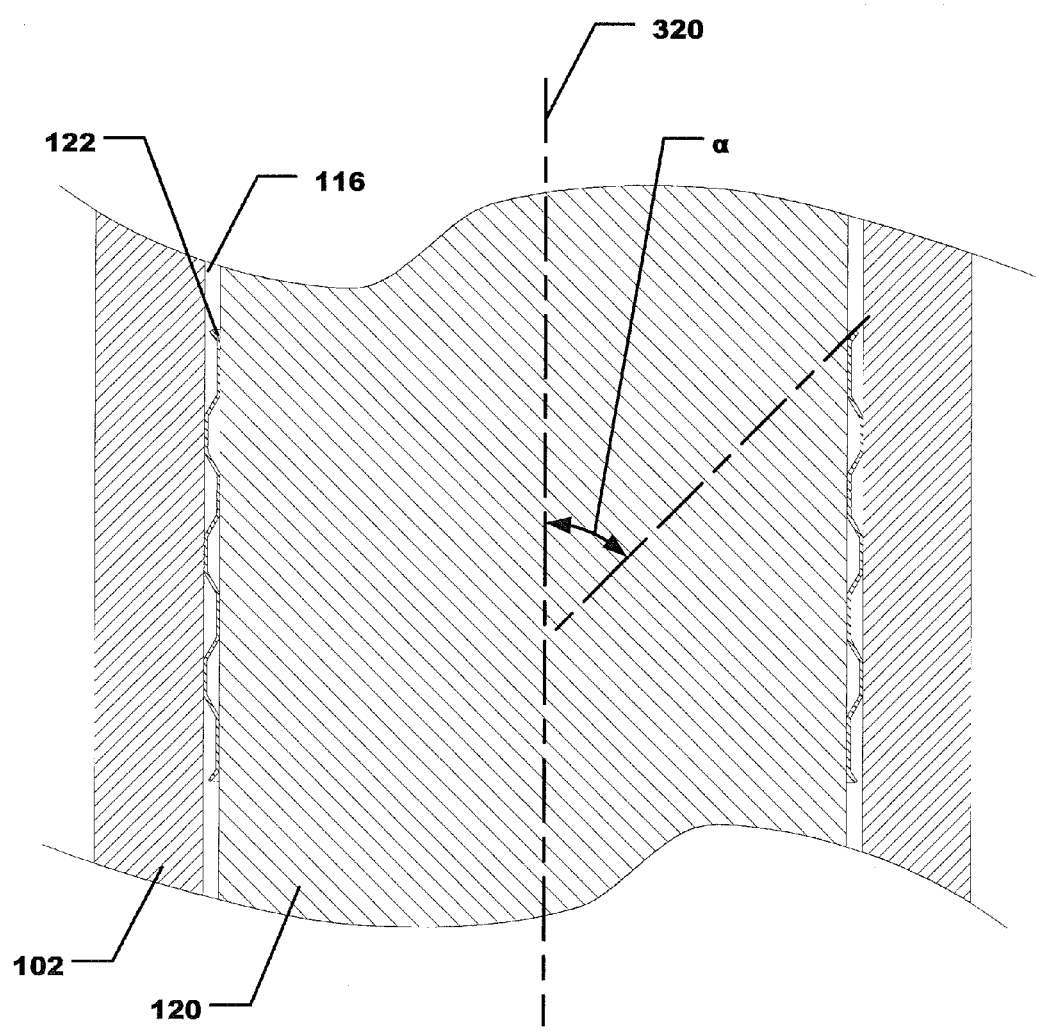
FIG. 2 includes a cross-sectional view of a hard disk drive assembly in accordance with an embodiment.

Accordingly, as shown in FIG. 2, the tolerance ring 122 can be installed within the bore 116 between an outer component, the actuator arm 102, and an inner component, the pivot 120. In a particular aspect, when installed, no portion of the tolerance ring 122 extends beyond the top or bottom of the bore and the tolerance ring 122 can be completely contained within the bore 116. In another aspect, a portion of the tolerance ring 122, e.g., a top, a bottom, a structure on a top, a structure on a bottom, or a combination thereof, can extend from the bore.

As illustrated in FIG. 2, and described in greater detail below, the tolerance ring 122 can be configured to engage the inner wall of the bore 116 and the outer wall of the pivot 120 in order to maintain the pivot 120 within the actuator arm 102 in an interference fit. The tolerance ring 122 can account for dimensional variations by expanding around the pivot 120 as it is installed thereon and then, at least partially deforming, or compressing, within the bore 116 during installation.

Figure 3:
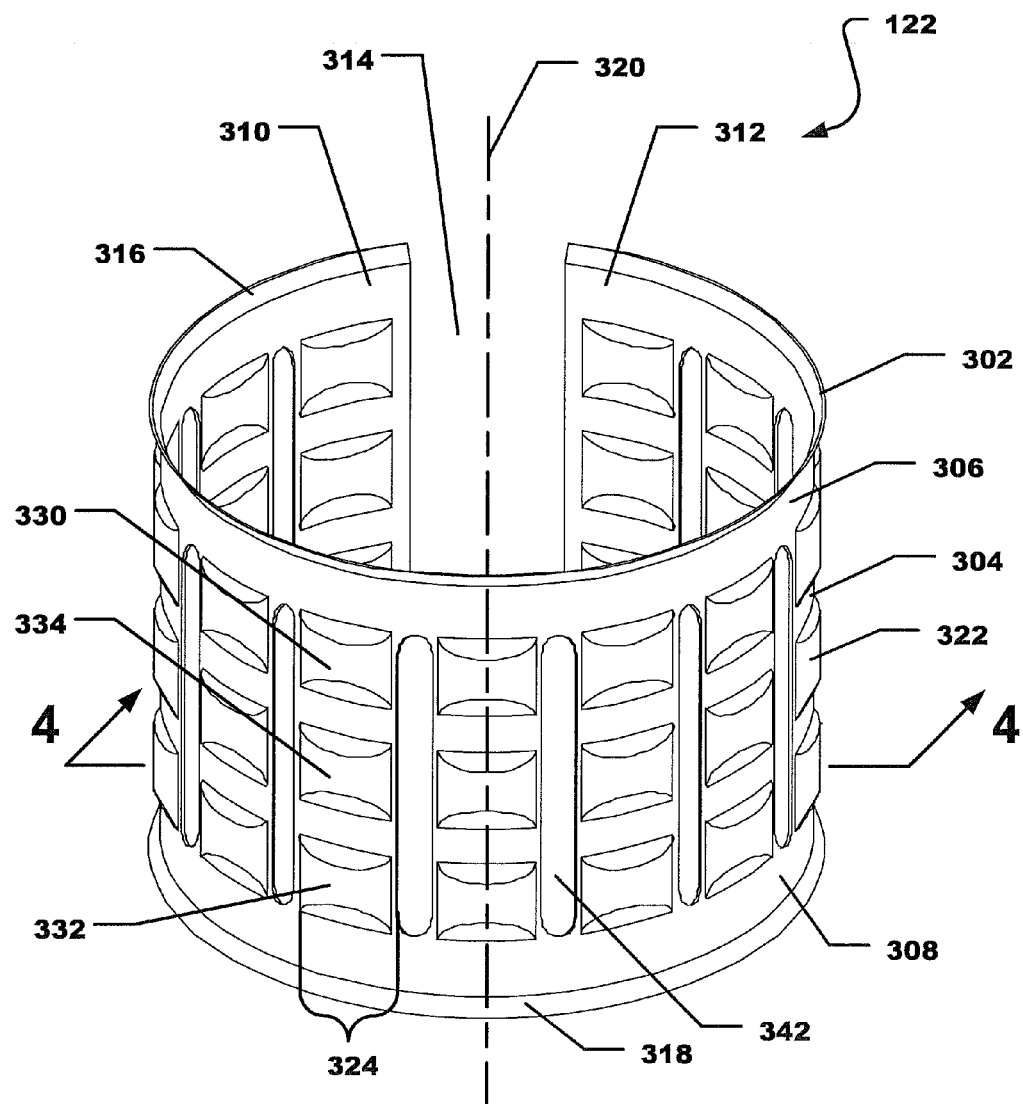
FIG. 3 includes a perspective view of a tolerance ring in accordance with an embodiment.
Figure 4:
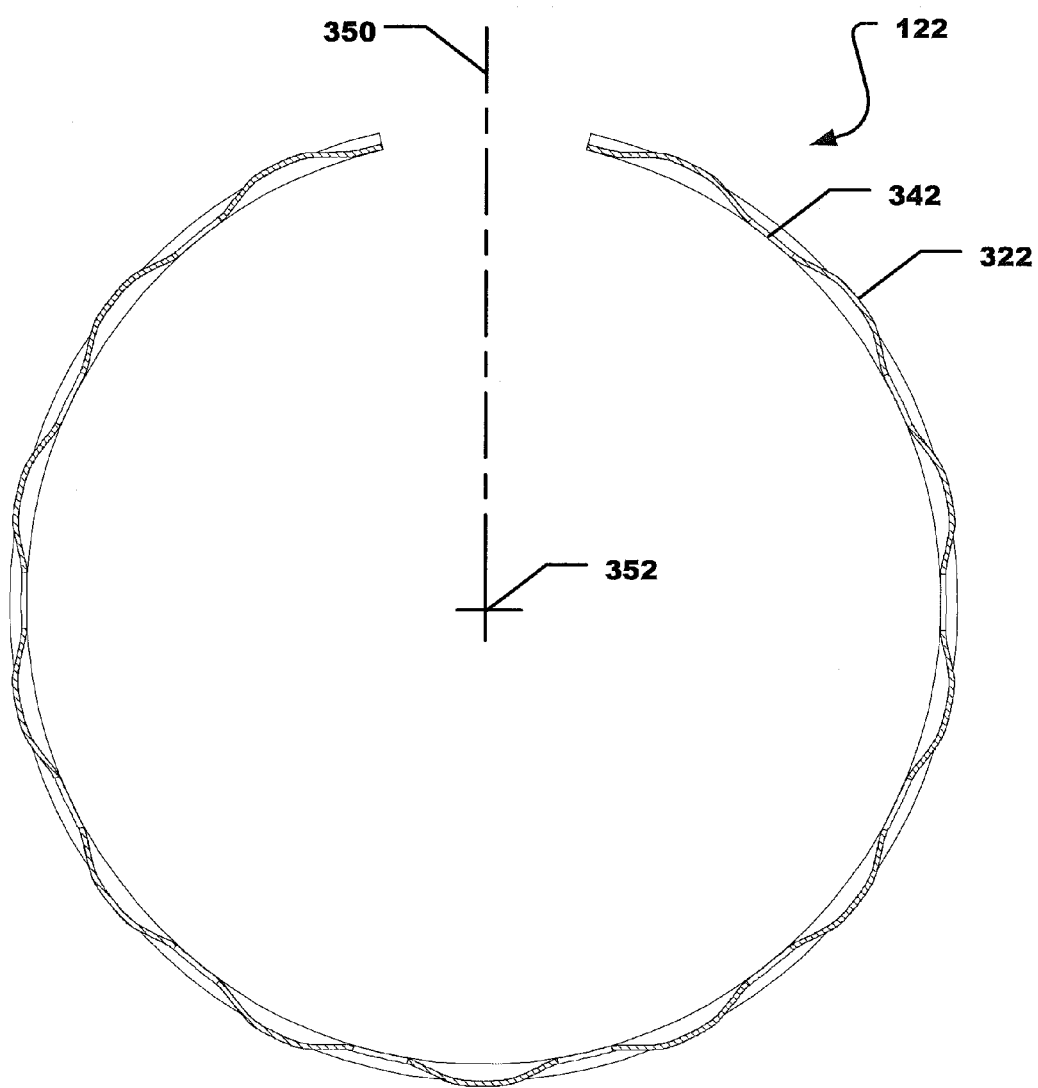
FIG. 4 includes a cross-sectional view of a tolerance ring in accordance with an embodiment taken along Line 4-4 in FIG. 3.
Figure 5:
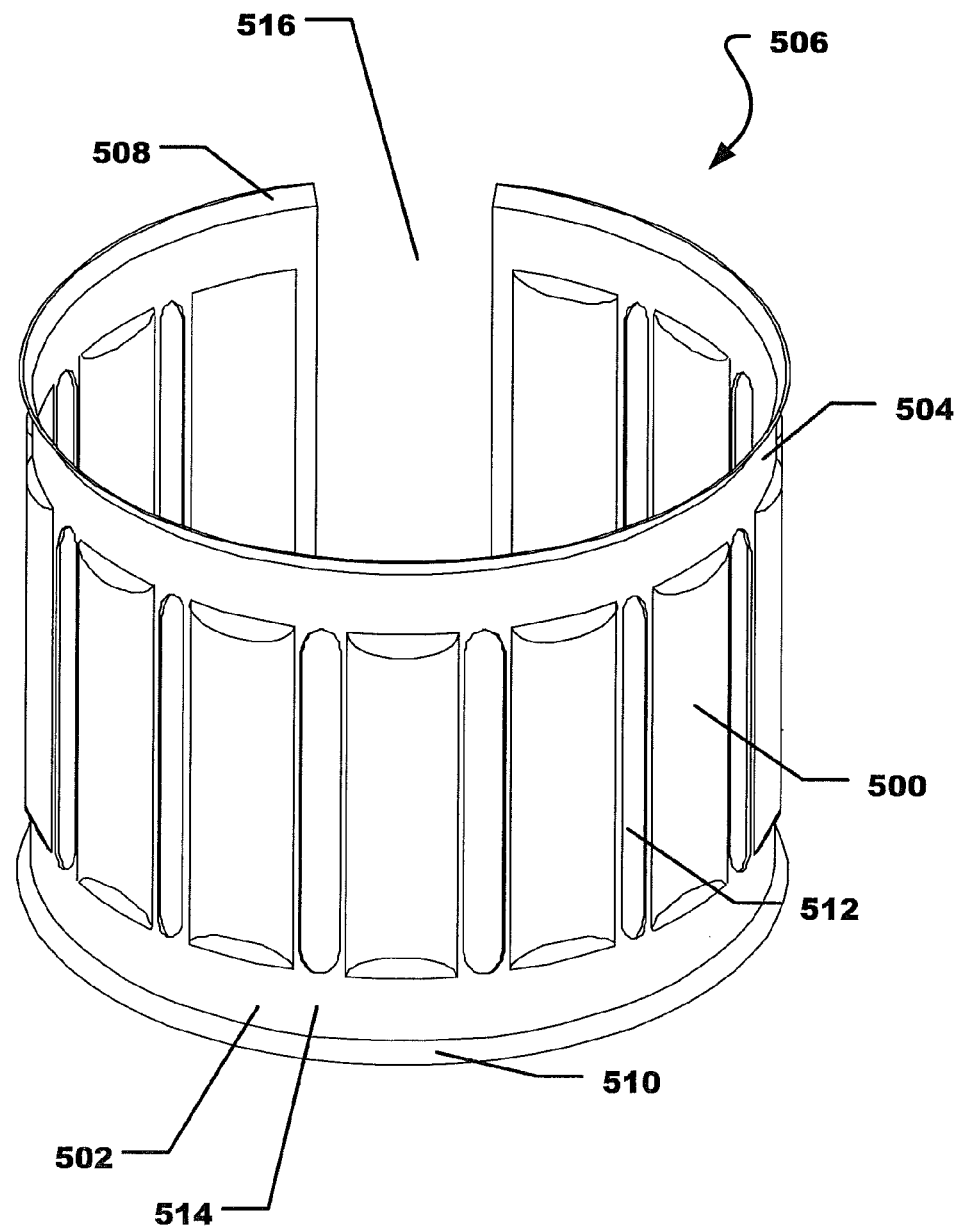
FIG. 5 includes a perspective view of a tolerance ring in accordance with another embodiment.

Referring now to FIG. 3, FIG. 4, and FIG. 5, details concerning the tolerance ring 122 are illustrated. As depicted, the tolerance ring 122 can include a generally cylindrical body 302 having a generally cylindrical sidewall 304. The sidewall 304 can include a top 306 and a bottom 308. Further, the sidewall 304 can include a first end 310 and a second end 312. Moreover, a gap 314 can be established between the first end 310 and the second end 312 of the sidewall 304. The gap 314 can extend along the entire length of the body 302 and the gap 314 can establish a split in the body 302.

As indicated in FIG. 3, the body 302 of the tolerance ring 122 can further include an upper flange 316 extending from the top 306 of the sidewall 304 and a lower flange 318 extending from the bottom 308 of the sidewall 304.

The tolerance ring 122 can include a central axis 320 and as shown in FIG. 2 and FIG. 3, in a particular aspect, the flanges 316, 318 can be angled in an outward direction with respect to the central axis 320 of the tolerance ring 122. It is to be understood that the flanges 316, 318 can be angled in an inward direction with respect to the central axis 320. In either case, the flanges 316, 318 can form an angle, α, with respect the central axis 320. In a particular aspect, α can be ≥5°, such as ≥10°, or ≥15°. In another aspect, α can be ≤30°, such as ≤25°, or ≤20°. In another aspect, α can be within a range between, and including, any of the values disclosed above.

As most clearly illustrated in FIG. 2, the tolerance ring 122 may include an overall wall thickness, $t_{OW}$, that is the distance between the inner surface of the sidewall 304 of the tolerance ring 122 and an outer surface of a wall structure formed in the sidewall 304 of the tolerance ring 122. Further, each flange 316, 318 can extend from the sidewall 304 such that each flange 316, 318 has an overall flange thickness, $t_{OF}$, that is the distance between the inner surface of the sidewall 304 of the tolerance ring 122 and the outer edge of the flange 316, 318. In a particular aspect, $t_{OF}$ can be ≥30% $t_{OW}$, such as ≥35% $t_{OW}$, ≥40% $t_{OW}$, ≥45% $t_{OW}$, ≥50% $t_{OW}$, ≥55% $t_{OW}$, or ≥60% $t_{OW}$. Further, $t_{OF}$ can be ≤98% $t_{OW}$, such as ≤95% $t_{OW}$, ≤90% $t_{OW}$, ≤85% $t_{OW}$, or ≤80% $t_{OW}$. In another aspect, $t_{OF}$ can be within a range between, and including, any of the percentage values of $t_{OW}$ disclosed above.

In certain embodiments that include flanges and wall structures that extend in an inward direction relative to the central axis 320, $t_{OW}$ can be measured between an outer surface of the sidewall 304 of the tolerance ring 122 and an inner surface of a wall structure formed in the sidewall 304 of the tolerance ring 122. Further, in such embodiments, $t_{OF}$ is measured between the outer surface of the sidewall 304 of the tolerance ring 122 and the inner edge of the flange 316, 318.

Still referring to FIG. 2 and FIG. 3, the tolerance ring 122 can include a plurality of waves 322 formed in the sidewall 304 of the body 302. As illustrated, in one aspect, the waves 322 can extend in an outward direction with respect to the central axis 320. However, in another aspect, the waves 322 can extend in an inward direction with respect to the central axis 320.

The waves 322 can be formed, or otherwise arranged, in the sidewall 304 of the body 302 so that the tolerance ring 122 includes a plurality of wave structures, such as wave columns 324 that are equally spaced around the circumference of the sidewall 302 of the body 304 of the tolerance ring 122.

Each wave column 324 can include at least two waves 322 vertically aligned with each other along the sidewall 304 of the body 302 of the tolerance ring 122, e.g., along a length of the tolerance ring 122.

As illustrated in FIG. 3, in a particular aspect, each wave column 324 the tolerance ring 122 can a first wave 330 near the top 306 of the sidewall 304 of the body 302 of the tolerance ring 122 and a second wave 332 near the bottom 308 of the sidewall 304 of the body 302 of the tolerance ring 122. In a particular aspect, the first wave 330 can be centered within the top half of the length of the tolerance ring 122. Moreover, the second wave 332 can be centered within the bottom half of the length of the tolerance ring 122. Each wave column 324 can also include a third wave 334 between the first wave 330 and the second wave 332. The third wave 334 can be centered along the length of the tolerance ring 122.

In one aspect, the first wave 330 can be the same size as the second wave 332, e.g., length, width, height (measured from the outer surface of the sidewall 304). In another aspect, the first wave 330, the second wave 332, and the third wave 334 are the same size, e.g., length, width, height (measured from the outer surface of the sidewall 304). In particular, the first wave 330 and the second wave 332 can have a first length, $L_1$, and the third wave 334 includes a second length, $L_2$, and $L_2 \leq L_1$. Specifically, $L_2$ can be $\leq 75\% L_1$, such as $L_2 \leq 70\% L_1$, $L_2 \leq 65\% L_1$, $L_2 \leq 60\% L_1$, $L_2 \leq 55\% L_1$, or $L_2 \leq 50\% L_1$. In another aspect, $L_2$ can be $\geq 25\% L_1$, such as $L_2 \geq 30\% L_1$, $L_2 \geq 35\% L_1$, or $L_2 \geq 40\% L_1$. In another aspect, $L_2$ can be within a range between, and including, any of the percentage values of $L_1$ disclosed above.

FIG. 3, FIG. 4, and FIG. 5 further indicate that the sidewall 304 of the body 302 of the tolerance ring 122 can include a plurality of unformed sections 340. Each unformed section 340 can comprise a section of the sidewall 304 that extends between adjacent wave columns 324 and is not formed with any waves or other structures. Moreover, each unformed section 340 can extend between adjacent wave columns 324 between the upper flange 316 and the lower flange 318 of the body 302 without any additional structure or feature formed between the flanges 316, 318.

As indicated in FIG. 5, the wave columns 324 and the unformed sections 340 can alternate around the circumference of the sidewall 304. Moreover, in a particular aspect, the wave columns 324 are evenly spaced around the circumference of the sidewall 304 by the unformed sections 340 of the sidewall 304.

FIG. 3 and FIG. 5 indicate that the sidewall 304 of the body 302 of the tolerance ring 122 can be formed with a plurality of slots 342 that can extend radially through the sidewall 304 of the body 302. In particular, the slots 342 can extend along the unformed sections 340 of the sidewall 304. In a particular aspect, the body 302 has a length, L, and the slot has a length, $L_S$. Further, $L_S \geq 80\% L$, such as $\geq 85\% L$, or $\geq 90\% L$. In another aspect, $L_S \leq 99\% L$, such as $\leq 98\% L$, $\leq 97\% L$, $\leq 96\% L$, $\leq 95\% L$. Moreover, $L_S$ can be within a range between, and including, any of the percentage of L values described herein.

In another aspect, each unformed section 340 has a width, $W_{US}$. Further, each slot 342 has a width, $W_S$. In a particular aspect, $W_S$ can be $\geq 50\% W_{US}$, such as $\geq 55\% W_{US}$, $\geq 60\% W_{US}$, $\geq 65\% W_{US}$, $\geq 70\% W_{US}$, $\geq 75\% W_{US}$, $\geq 80\% W_{US}$, $\geq 85\% W_{US}$, or $\geq 90\% W_{US}$. In another aspect, $W_S$ can be $\leq 99\% W_{US}$, such as $\leq 98\% W_{US}$, $\leq 97\% W_{US}$, $\leq 96\% W_{US}$, or $\leq 95\% W_{US}$. $W_S$ can be within a range between, and including, any of the percentage of $W_{US}$ values described above.

In yet another aspect, each wave structure has an overall length, $L_{WS}$. For a wave column, $L_{WS}$ can be measured from a top of an upper wave and a bottom of a lower wave. For an elongated wave, described below, $L_{WS}$ can be measured from the top of the elongated wave to the bottom of the elongated wave. In a particular aspect, $L_S$ can be $\geq 50\% L_{WS}$, such as $\geq 55\% L_{WS}$, $\geq 60\% L_{WS}$, $\geq 65\% L_{WS}$, $\geq 70\% L_{WS}$, $\geq 75\% L_{WS}$, $\geq 80\% L_{WS}$, $\geq 85\% L_{WS}$, $\geq 90\% L_{WS}$, or $\geq 95\% L_{WS}$. Moreover, $L_S$ can be $\leq 110\% L_{WS}$, such as $\leq 109\% L_{WS}$, $\leq 108\% L_{WS}$, $\leq 107\% L_{WS}$, $\leq 106\% L_{WS}$, or $\leq 105\% L_{WS}$. $L_S$ can be within a range between, and including, any of the percentage of $L_{WS}$ values described above.

In another aspect, each slot 342 can includes a first end and a second end and each end can be rounded. Further, each slot 342 is centered circumferentially and longitudinally within each unformed section 340.

In a particular aspect, an unformed section without a slot 342, i.e., a solid unformed section, can include a circumferential wave-to-wave force transfer, FT, in which force exerted on one wave structure is transmitted through the solid unformed section to an adjacent wave structure. In certain applications, a relatively high FT can be undesirable. Removing a portion, or nearly all, of the unformed section can substantially reduce FT and an unformed section 340 having a slot 342 formed therein can have a circumferential wave-to-wave transfer, $FT_S$, which is less than FT. For example, $FT_S$ can be $\leq 50\%$ FT, such as $\leq 45\%$ FT, $\leq 40\%$ FT, $\leq 35\%$ FT, $\leq 30\%$ FT, $\leq 25\%$ FT, $\leq 20\%$ FT, $\leq 15\%$ FT, or $\leq 10\%$ FT. Further, $FT_S$ can be $\geq 1\%$ FT, such as $\geq 2\%$ FT, $\geq 3\%$ FT, $\geq 4\%$ FT, or $\geq 5\%$ FT. In another aspect, $FT_S$ can be within a range between, and including, any of the percentage of FT values described above.

Removing a portion of the unformed section 342 adjacent to a wave 322, or wave structure, can alter the stiffness of the adjacent wave 322. In particular, by removing a portion of the wave 322, the stiffness of the adjacent wave can be reduced from an identical wave 322 not adjacent to a slotted unformed section 342. In other words, a wave adjacent to an unslotted unformed section 342 can include a stiffness, S, and after a slot 342 is cut, punched, or otherwise made, in an unformed section 342 adjacent to the wave 322, the resulting wave can have a stiffness, $S_S$. $S_S$ can be less than S. For example, $S_S$ can be $\leq 95\%$ S, such as $S_S \leq 90\%$ S, $\leq 85\%$ S, $\leq 80\%$ S, $\leq 75\%$ S, $\leq 70\%$ S, or $\leq 65\%$ S. Moreover, $S_S$ can be $\geq 25\%$ S, such as $\geq 30\%$ S, $\geq 35\%$ S, $\geq 40\%$ S, $\geq 45\%$ S, or $\geq 50\%$ S. In another aspect, $S_S$ can be within a range between, and including, any of the percentage of S values described above.

FIG. 4 indicates that the tolerance ring 122 can include a central axis 350 that can pass through a center 352 of the tolerance ring 122 and bisect the gap 314. In a particular aspect, the tolerance ring 122 can be symmetric about the central axis 350.

In a particular aspect, when the pivot assembly 104 is installed within the bore 116 of the actuator arm with the tolerance ring 122 disposed there between, the pivot 120 and the bore 116 can include a central axis that lies along, or nearly along, the central axis 320 of the tolerance ring 122. The tolerance ring 122 can provide an axial stiffness that can substantially resist rocking movement of the pivot 120 relative to the bore 116 and the actuator arm 102 in which the central axis of the pivot 120 rotates about an axis perpendicular to the central axis (a longitudinal axis) with respect to the central axis 320.

When left unconstrained, such rocking motion can cause the read/write heads 114 to contact a hard disk. This contact is undesired and can cause failure of a hard disk drive. By modifying the unformed sections adjacent to wave structures as described herein, the axial stiffness of the tolerance ring 122 can be manipulated to substantially reduce any variations in the axial stiffness caused by the reduction in axial stiffness due to the gap 314. Further, by modifying the unformed sections adjacent to the wave structures, the axial stiffness of the tolerance ring 122 can be manipulated so that the axial stiffness of the tolerance ring 122 does not vary too greatly when measured at various locations circumferentially around the tolerance ring 122.

For example, the axial stiffness of the tolerance ring 122 through the gap 314, $AS_G$, can be measured in a first direction that passes through the gap 314 and a center 360 of the tolerance ring 122. The axial stiffness of the tolerance ring 122 perpendicular to the gap 314, $AS_{PG}$, can be measured in a second direction perpendicular to the first direction. $AS_G$ can be $\geq 90\% AS_{PG}$, such as $\geq 91\% AS_{PG}$, $\geq 92\% AS_{PG}$, $\geq 93\% AS_{PG}$, $\geq 94\% AS_{PG}$, $\geq 95\% AS_{PG}$, or $\geq 96\% AS_{PG}$. Further, $AS_G$ can be $\leq 100\% AS_{PG}$, $\leq 99\% AS_{PG}$, $\leq 98\% AS_{PG}$, or $\leq 97\% AS_{PG}$. Moreover, $AS_G$ can be within a range between, and including, any of the percentage values of $AS_{PG}$ disclosed above.

Additionally, the resonant frequency of the tolerance ring 122 does not vary greatly when measured at various locations circumferentially the assembly in which the tolerance ring 122 is installed. For example, the resonant frequency of the tolerance ring 122 through the gap 314, $RF_G$, can be measured in a first direction that passes through the gap 314 and the center 360 of the tolerance ring 122. The resonant frequency of the tolerance ring 122 perpendicular to the gap 314, $RF_{PG}$, can be measured in a second direction perpendicular to the first direction. $RF_G$ can be ≥90% $RF_{PG}$, such as ≥91% $RF_{PG}$, ≥92% $RF_{PG}$, ≥93% $RF_{PG}$, ≥94% $RF_{PG}$, or ≥95% $RF_{PG}$. Further, $RF_G$ can be ≤100% $RF_{PG}$, ≤99% $RF_{PG}$, ≤98% $RF_{PG}$, ≤97% $RF_{PG}$, or ≤96% $RF_{PG}$. Moreover, $RF_G$ can be within a range between, and including, any of the percentage values of $RF_{PG}$ disclosed above.

Referring now to FIG. 5, in another aspect, each wave structure can include a single elongated wave 500. The elongated waves 500 can extend longitudinally along a sidewall 502 of a body 504 of a tolerance ring 506. Further, each elongated wave 500 can extend substantially along a length of the sidewall 502 of the tolerance ring 506 between an upper flange 508 and a lower flange 510. The tolerance ring 506 can also include a gap 514. In this aspect, each elongated wave 500 can be centered along the length of the tolerance ring 500. Moreover, this aspect of the tolerance ring 500 can include one or more of the features or characteristics described herein with respect to the other tolerance rings disclosed herein. In this aspect, a slot 512 can be formed in the sidewall 502 of the tolerance ring 506 within an unformed section 514 between adjacent elongated waves 500. Further, the tolerance ring can include a gap 516.

In each embodiment described herein, two wave structures, e.g., elongated waves, wave columns, or a combination thereof, will always be located circumferentially closer to a gap 314, 516 than the remaining wave structures. The two wave structures adjacent to the gap 314, 516, i.e., the two wave structures closest to the gap 314 can include a first wave stiffness, $SW_1$. The other wave structures that are adjacent to unformed sections can include a second wave stiffness, $SW_2$. Without modification of the tolerance ring 122, 500, and with similarly sized and shaped waved structures on the tolerance ring 122, 500, $SW_1$ can be ≤$SW_2$.

However, modifying the wave structures 322, 500, by changing one or dimensions of the wave structures 322, 500 or by making a slot in the unformed sections 340, 614 between the wave structures 322, 500 the stiffness of the waves can be manipulated as described herein. Accordingly, slots 342, 512 formed in unformed sections 342, 514 of the sidewall 304, 504 that are circumferentially closer to the gap 314, 516 can be different sized, different shaped, or different sized and shaped, than slots 342, 512 formed in the sidewall 304, 504 that are circumferentially further from the gap 314, 516. In particular, the slots 322, 600 can increase in size, e.g., length, width, or a combination thereof, along the circumference of the sidewall 304, 604 from the gap 314, 516 to a location along the circumference of the sidewall 304, 604 furthest from the gap 314, 516 (i.e., 180° from the gap 314, 516).

Figure 6:
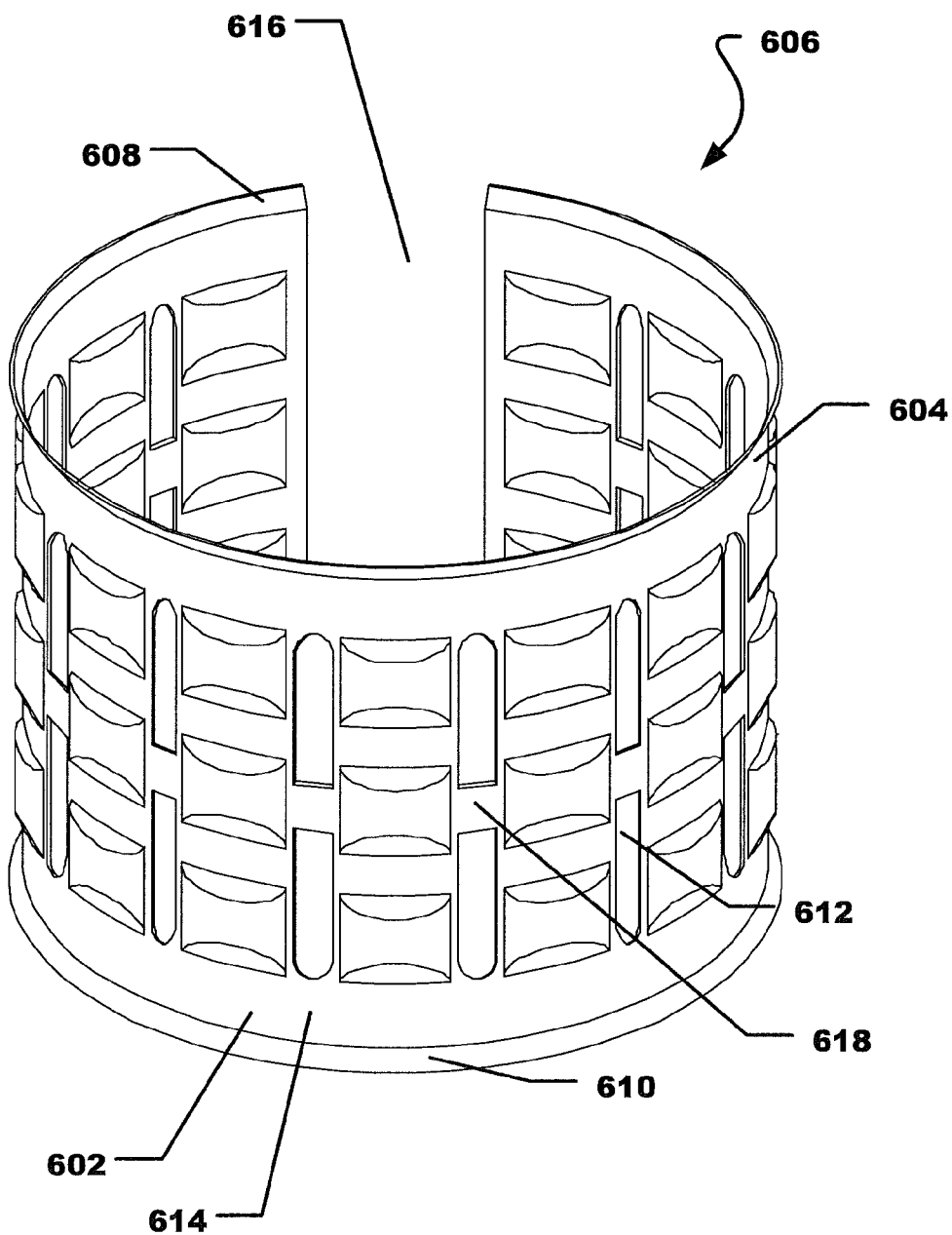
FIG. 6 includes a perspective view of a tolerance ring in accordance with yet another embodiment.

FIG. 6 shows another tolerance ring 600 formed with slots 602 in the unformed sections 604 of the sidewall 606. As illustrated, the slots 602 can be bifurcated, or otherwise split, by a slot bridge 608. In a particular aspect, the slot bridge can alter the wave stiffness adjacent at or near the bridged slot, $WS_{BS}$, so that a wave stiffness of a wave adjacent to a slot, $WS_S$, is less than $WS_{BS}$. $WS_{BS}$ can be associated with a single wave, e.g., a central wave in a wave column, or a portion of a wave, e.g., a middle of an elongated wave. By altering the stiffness of a central wave or a central portion of a wave, the tolerance ring 600 can retain structural rigidity through the middle of the tolerance ring while still providing an axial stiffness that only slightly varies in various directions at the top and bottom of the tolerance ring.

In a particular aspect, $WS_S$ can be ≤50% $WS_{BS}$, such as ≤45% $WS_{BS}$, ≤40% $WS_{BS}$, ≤35% $WS_{BS}$, ≤30% $WS_{BS}$, ≤25% $WS_{BS}$, or ≤20% $WS_{BS}$. In another aspect, $WS_S$ can be ≥1% $WS_{BS}$, such as ≥2% $WS_{BS}$, ≥3% $WS_{BS}$, ≥4% $WS_{BS}$, or ≥5% $WS_{BS}$. Moreover, $WS_S$ can be within a range between, and including, any of the percentage of $WS_{BS}$ values.

Figure 7:
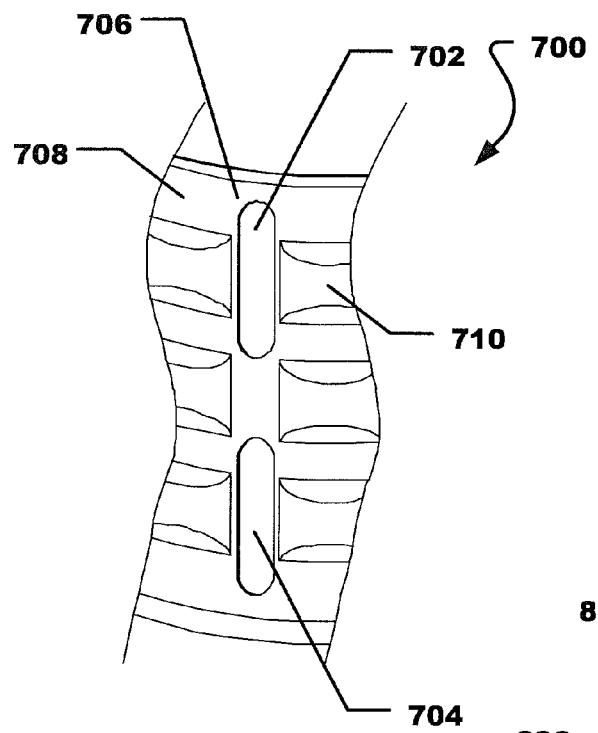
FIG. 7 includes a partial perspective view of a tolerance ring in accordance with still another embodiment.

FIG. 7 depicts yet another tolerance ring 700 having an upper slot 702 and a lower slot 704 formed in an unformed section 706 of a sidewall 708. The slots 702, 704 can be separate, discrete, slots 702, 704 that are vertically aligned between adjacent wave structures 710. In one aspect, the upper slot 702 can be formed near a top of the sidewall 708 of the tolerance ring 700 and as such, near a top of an elongated wave and the lower slot 704 can be formed near a bottom of the sidewall 708 of the tolerance ring 700 and as such, near a bottom of an elongated wave. In another aspect, the upper slot 702 can be formed between adjacent upper waves and the lower slot 704 can be formed between adjacent lower waves. Each slot 702, 704 can have a length, $L_S$, and each upper and lower wave can have a length, $L_W$. In a particular aspect, $L_S$ can be ≥75% $L_W$, such as ≥80% $L_W$, ≥85% $L_W$, ≥90% $L_W$, ≥95% $L_W$, or ≥100% $L_W$. Further, $L_S$ can be ≤200% $L_W$, such as ≤175% $L_W$, ≤150% $L_W$, or ≤125% $L_W$. Additionally, $L_S$ can be within a range of any of the percentage of $L_W$ values described herein.

Figure 8:
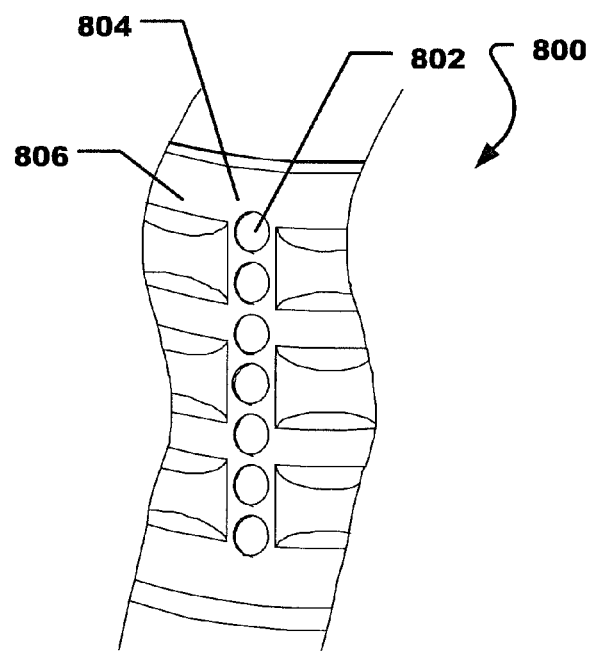
FIG. 8 includes a partial perspective view of a tolerance ring in accordance with yet still another embodiment.

Referring to FIG. 8, another embodiment of a tolerance ring is shown and is generally designated 800. As illustrated, the tolerance ring 800 includes a plurality of closely spaced, vertically aligned holes 802 formed radially through the unformed section 804 of the sidewall 806. The size and distance between the holes 802 can be modified in order to modify the weakness imparted to the unformed section 804 of the sidewall 806. For example, increasing the hole diameter 802 and decreasing the distance between the holes 802 can increase the weakness in the unformed section 804 of the sidewall 806. Conversely, decreasing the hole diameter 802 and increasing the distance between the holes 802 can decrease the weakness in the unformed section 804 of the sidewall 806.

In a particular aspect, the holes 802 can have the same diameter or different diameters. For example, a hole 802 located along the vertical center of the tolerance ring 800 can have the smallest diameter and the remaining holes 802 can progressively increase in diameter toward a top and a bottom of the tolerance ring 800. Alternatively, a hole 802 located along the vertical center of the tolerance ring 800 can have the largest diameter and the remaining holes 802 can progressively decrease in diameter toward a top and a bottom of the tolerance ring 800.

In a particular aspect, a tolerance ring according to any of the aspects described herein can be made from a metal, a metal alloy, or a combination thereof. The metal can include a ferrous metal. Further, the metal can include steel. The steel can include stainless steel, such as austenitic stainless steel. Moreover, the steel can include stainless steel comprising chrome, nickel, or a combination thereof. For example, the steel can X10CrNi18-8 stainless steel. Further, the tolerance ring can include a Vickers pyramid number hardness, VPN, which can be ≥350, such as ≥375, ≥400, ≥425, or ≥450. VPN can also be ≤500, ≤475, or ≤450. VPN can also be within a range between, and including, any of the VPN values described herein. In another aspect, the tolerance ring can be treated to increase its corrosion resistance. In particular, the tolerance ring can be passivated. For example, the tolerance ring can be passivated according to the ASTM standard A967.

In another aspect, the stock material from which the tolerance ring can be formed can have a thickness, t, and t can be ≥0.085 mm, such as ≥0.087 mm, ≥0.090 mm, ≥0.095 mm, or ≥0.100 mm. In another aspect, t can be ≤0.115 mm, ≤0.113 mm, ≤0.110 mm, or ≤0.105 mm. Moreover, t can be within a range between, and including, any of the values of t disclosed above.

The tolerance ring according to any of the aspects described herein may have an overall outer diameter, OD, and OD can be ≥5 mm, such as ≥6 mm, ≥7 mm, ≥8 mm, ≥9 mm, or ≥10 mm. The OD can be ≤20 mm, such as ≤15 mm, ≤14 mm, ≤13 mm, ≤12 mm, or ≤10 mm. Further, OD can be within a range between and including any of the values of OD described herein.

In another aspect, the tolerance ring can have an overall length, L, and L can be ≤20 mm, such as ≤17 mm, ≤15 mm, ≤14 mm, or ≤13 mm. L can be ≥5 mm, ≥6 mm, ≥7 mm, ≥8 mm, ≥9 mm, or ≥10 mm. Moreover, L can be within a range between, and including, any of the values of L described above.

Additionally, after the stock material that is used to form any of the tolerance rings described herein is cut, stamped, and rolled to form the tolerance ring, the resulting tolerance ring is substantially free of any burrs. Specifically, no burrs are visible along any of the cut edges under a visual inspection of the tolerance ring under 10× magnification.

EXAMPLE

A tolerance ring is manufactured from X10CrNi18-8 stainless steel stock. The stainless steel stock has a thickness of 0.1 mm±0.013. Further, the stainless steel stock has a VPN of 400-450 and is passivated according to ASTM standard A967. The formed tolerance ring includes thirteen wave columns equally spaced around the circumference of the sidewall. The distance between the centers of each adjacent pair of wave columns along the circumference of the sidewall is approximately 2.62 mm.

Further, each wave column includes three waves that are vertically aligned. The upper wave and the lower wave are approximately 1.66 mm wide and 3.0 mm tall. The middle wave is approximately 1.66 mm wide and 1.5 mm tall. The tolerance ring has an overall wall thickness after installation of about 0.3 mm. Further, the tolerance ring has an overall free-state diameter of 11.5 mm and an overall length of 12.5 mm.

The tolerance ring includes twelve slots formed in the unformed sections of the sidewall. Specifically, a slot is formed in the unformed section of sidewall between each adjacent pair of wave columns. Each slot is centered between the wave columns and centered along a length of the tolerance ring. Each slot is approximately 0.6 mm wide and 10 mm long.

The tolerance ring is installed around a post having an outer diameter of 11.135 mm and this assembly is installed within a ring having a bore of approximately 11.722 mm. This assembly is suspended using fishing line and two lasers are placed perpendicular to a flat face of the ring on the same side of the ring. The lasers are placed 180 degrees from each other. One laser is used as a reference laser and the other laser is used as a measurement laser. The ring is tapped under the measurement laser using a hammer that has a force transducer incorporated therein.

Figure 9:
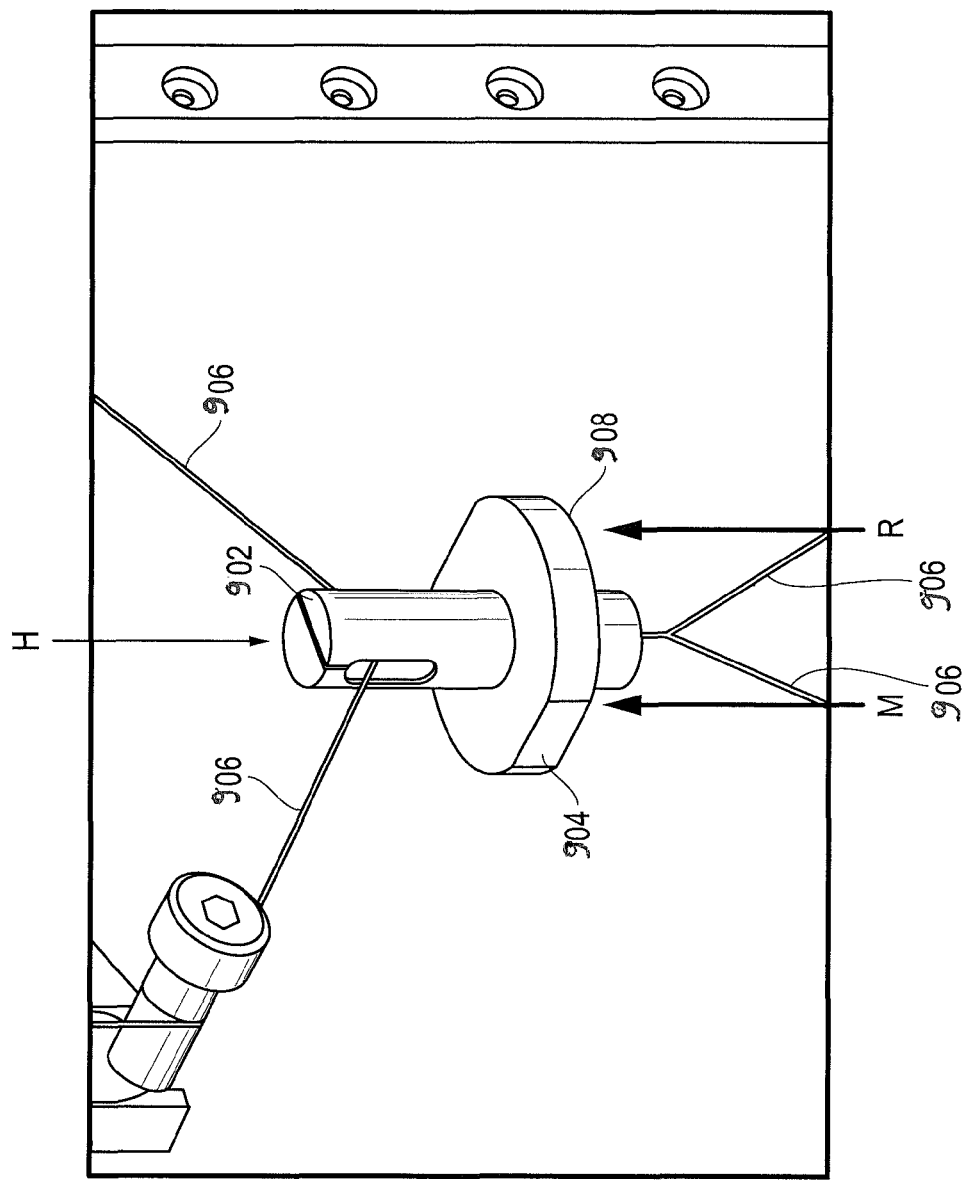
FIG. 9 includes a Hammer Test setup for testing on-axis axial stiffness.

FIG. 9 depicts a Hammer Test setup for on-axis axial stiffness testing. The tolerance ring is installed around a post 902 having an outer diameter of 11.135 mm and this assembly is installed within a ring 904 having a bore of approximately 11.722 mm. This assembly is suspended using fishing lines 906 and two lasers are placed perpendicular to a flat face of the ring 908 on the same side of the ring. The lasers are placed 180 degrees from each other. One laser is used as a reference laser R and the other laser is used as a measurement laser M. The post is tapped on-axis as indicated by the arrow labeled H from the side opposite of the lasers. The lasers and the force transducer of the hammer are coupled to a microprocessor and provide inputs to the microprocessor.

Figure 10A:
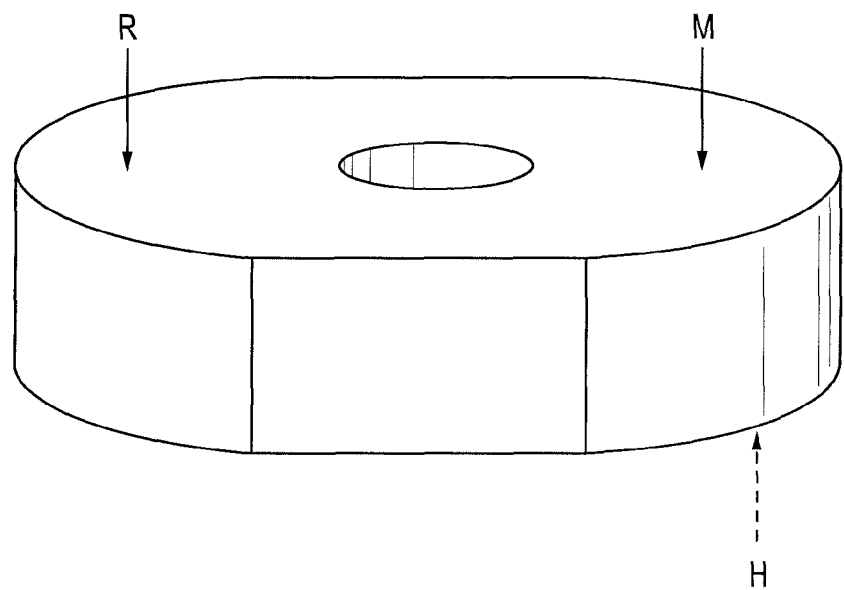
FIGS. 10A and 10B illustrate a Hammer Test for testing off-axial stiffness.
Figure 10B:
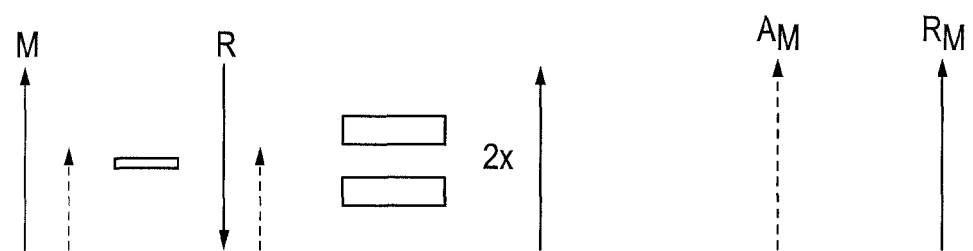

FIG. 10A illustrates the Hammer Test setup for off-axis axial stiffness testing. The tolerance ring is installed around a post having and within a ring as shown in FIG. 9 and suspended using fishing lines. As in FIG. 9, two lasers are placed perpendicular to a flat face of the ring on the same side of the ring. The lasers are placed 180 degrees from each other. One laser is used as a reference laser and the other laser is used as a measurement laser. The ring is tapped off-axis under the measurement laser as indicated by the arrow labeled H using a hammer that has a force transducer incorporated therein. The lasers and the force transducer of the hammer are coupled to a microprocessor and provide inputs to the microprocessor. FIG. 10B illustrates how the input is processed to compensate for the rocking mode $R_M$ and axial mode $A_M$ induced by the off-axis tap.

Figure 11A:
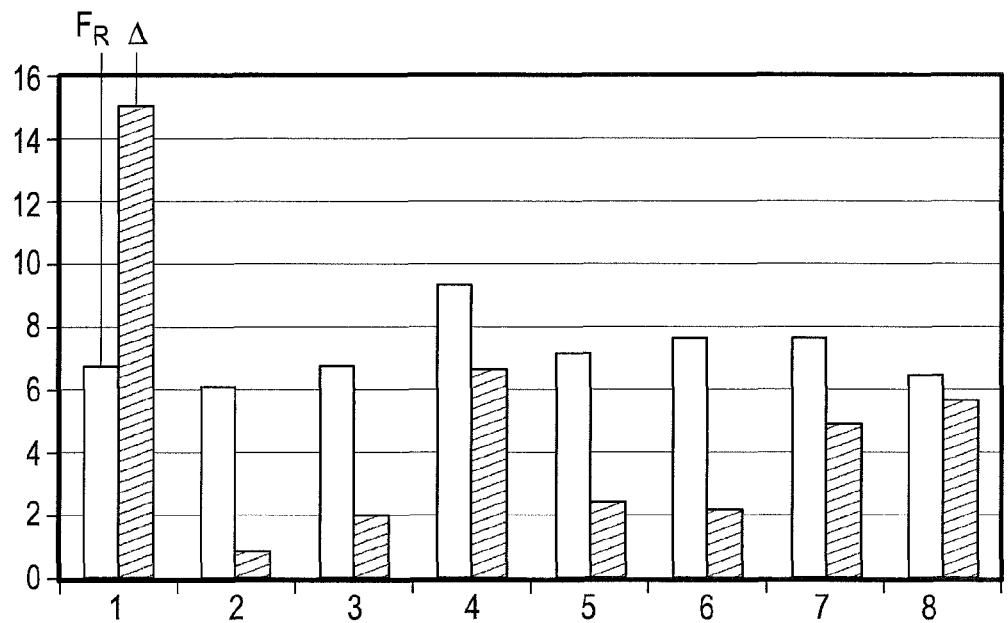
FIGS. 11A and 11B include the test results of on- and off-axis axial stiffness for various tolerance rings.
Figure 11B:
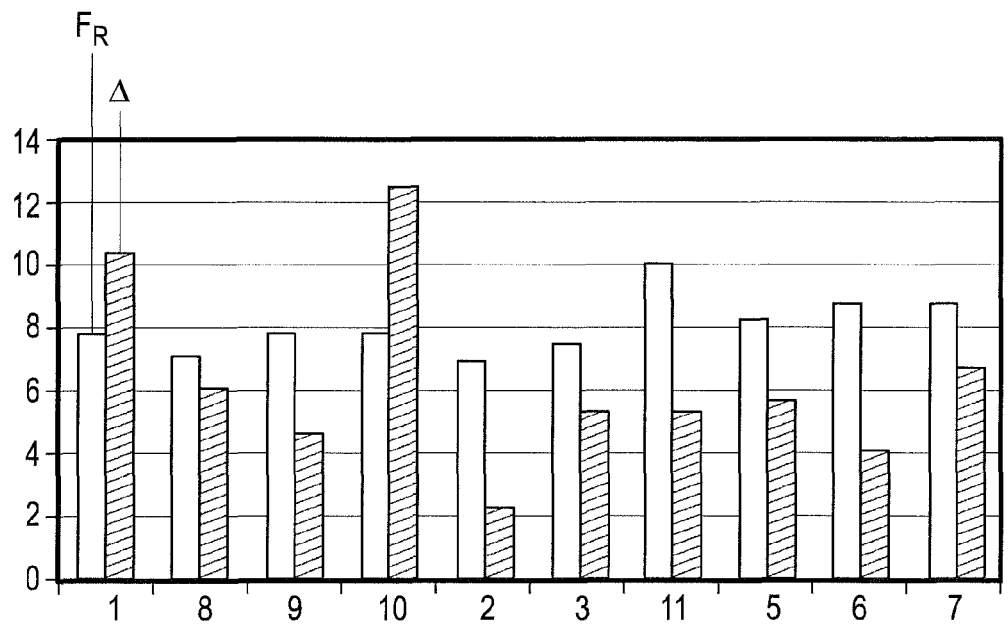

FIGS. 11A and 11B display the test results of on-axis and off-axis axial stiffness for various tolerance ring. In FIGS. 11A and 11B, the columns have the following designations. The $F_R$ provides the average resonant frequency in kHz of the ring; the $\Delta$ is the determined average percent difference around ring.

| | |
|---|---|
| 1 | Comparison A Tolerance Ring |
| 2 | eight wave quad ring |
| 3 | twelve wave quad ring |
| 4 | Double band Comp. ring |
| 5 | six wave pitch corrected |
| 6 | seven wave pitch corrected |
| 7 | eight wave pitch corrected |
| 8 | Comparison B Tolerance Ring |
| 9 | plannish (unformed) opposite gap |
| 10 | Center wave opposite gap |
| 11 | Ring with slits |

Ring 1 is a comparison ring being a 13 wave hard disc drive tolerance ring with three bands. Ring 2 is an eight wave ring in 4 groups. Ring 3 is a twelve waves tolerance ring in four groups. Ring 4 is similar to ring 1 but includes a double band. Ring 5 has six wave that are pitch corrected. Pitch corrected rings have waves distributed around the assembly with equal angular spacing. Rings 6 and 7 have a seven wave and eight wave pitch corrected arrangement, respectively. Ring 8 is a second comparison ring made from a new assembly batch having a 13 wave three band arrangement. Ring 9 has an unformed ("plannish") region opposite gap. Ring 10 has a centered wave opposite gap. Ring 11 is a 12 wave pitch corrected ring having slits located between waves. The slits have a length substantially to the length of the wave columns.

The radial stiffness of the ring in a dummy assembly is measured using a hammer test in 2 places; at the gap and at 90 degrees to the gap. The % difference is calculated between the average of 5 rings tested with 5 hits at each place. Since the tests were carried out with the same dummy masses, the resonant frequency is reported rather than the stiffness for ease of calculation, Equation 1.

The radial stiffness of the ring in a dummy assembly is measured using a hammer test in 2 places; at the gap and at 90 degrees to the gap. The % difference is calculated between the average of 5 rings tested with 5 hits at each place. Since the tests were carried out with the same dummy masses, the resonant frequency is reported rather than the stiffness for ease of calculation, Equation 1.

$$f = \frac{1}{2\pi}\sqrt{\frac{k}{m}}, \quad \text{(Eq. 1)}$$

wherein f is the resonant frequency, m is the effective mass, and k is the stiffness of the test piece.

Figure 12:
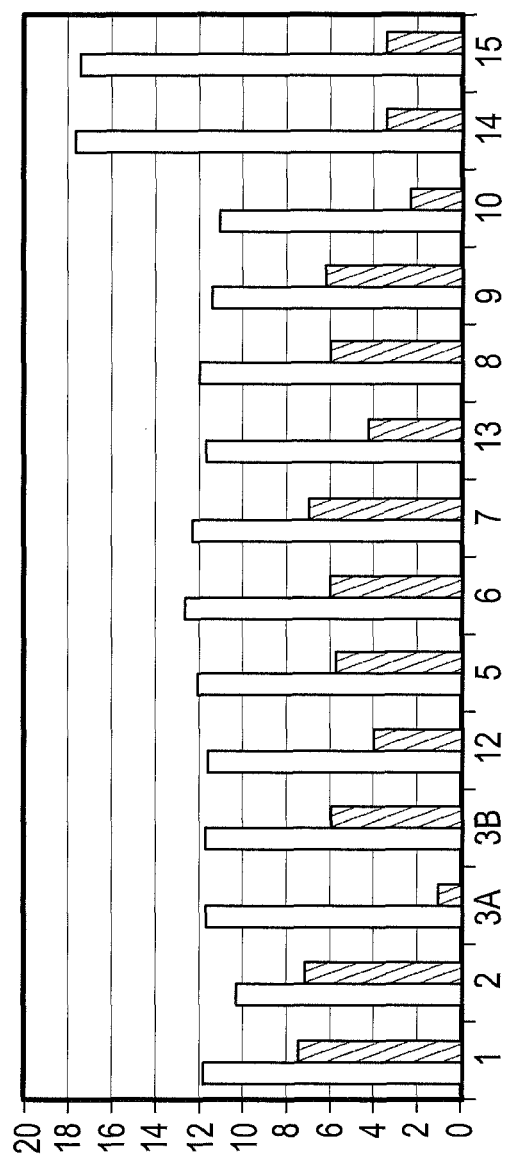
FIG. 12 includes the test results of radial stiffness for various tolerance rings.

FIG. 12 depicts the test results of radial stiffness testing for various tolerance ring. In FIG. 12, the columns have the same designations as in FIGS. 11A and 11B and as disclosed below. The $F_R$ provides the average resonant frequency in kHz of the ring; the $\Delta$ is the determined average percent difference around ring.

| | |
|---|---|
| 3A | 12 wave quad ring 40 lbf PAF |
| 3B | 12 wave quad ring 30 lbf PAF |
| 12 | Ring w/ holes |
| 13 | eleven wave pitch corrected |
| 14 | Ring housing variable |
| 15 | Ring with closed housing variable |

Ring 2A has a 40 lbf remaining assembly force. Ring 3B has 30 lbf remaining assembly force. Ring 12 is a 12 wave pitch corrected ring having holes between wave column, more specifically two holes between two waves. Ring 13 is an eleven wave pitch corrected. Ring 14 is a ring with housing variable, i.e. the ring can be squeezed to conform to a central bore. Ring 15 is a ring whit closed housing variable, i.e., the ring is smaller in diameter than its bore and can be stretched to conform to the bore.

For Peak assembly and initial slip testing, first the torque of a pivot is tested. The pivot is then assembled into an arm using the relevant tolerance ring and the peak assembly force (PAF) is recorded. The torque of the assembly is then tested and the difference between unassembled and assembled torque, or 'torque shift' is recorded. Next, the assembly is disassembled, and the initial slip is recorded and finally, the torque of the pivot is measured again. The pivot is re used until the post-assembled torque is considered high, or 5 times, whichever occurs first. The arm is re-used 5 times. These reusage policies are the result of previous investigation and shouldn't cause any problems, but it should be borne in mind that the pivot and arm are not virgin each time.

Figure 13:
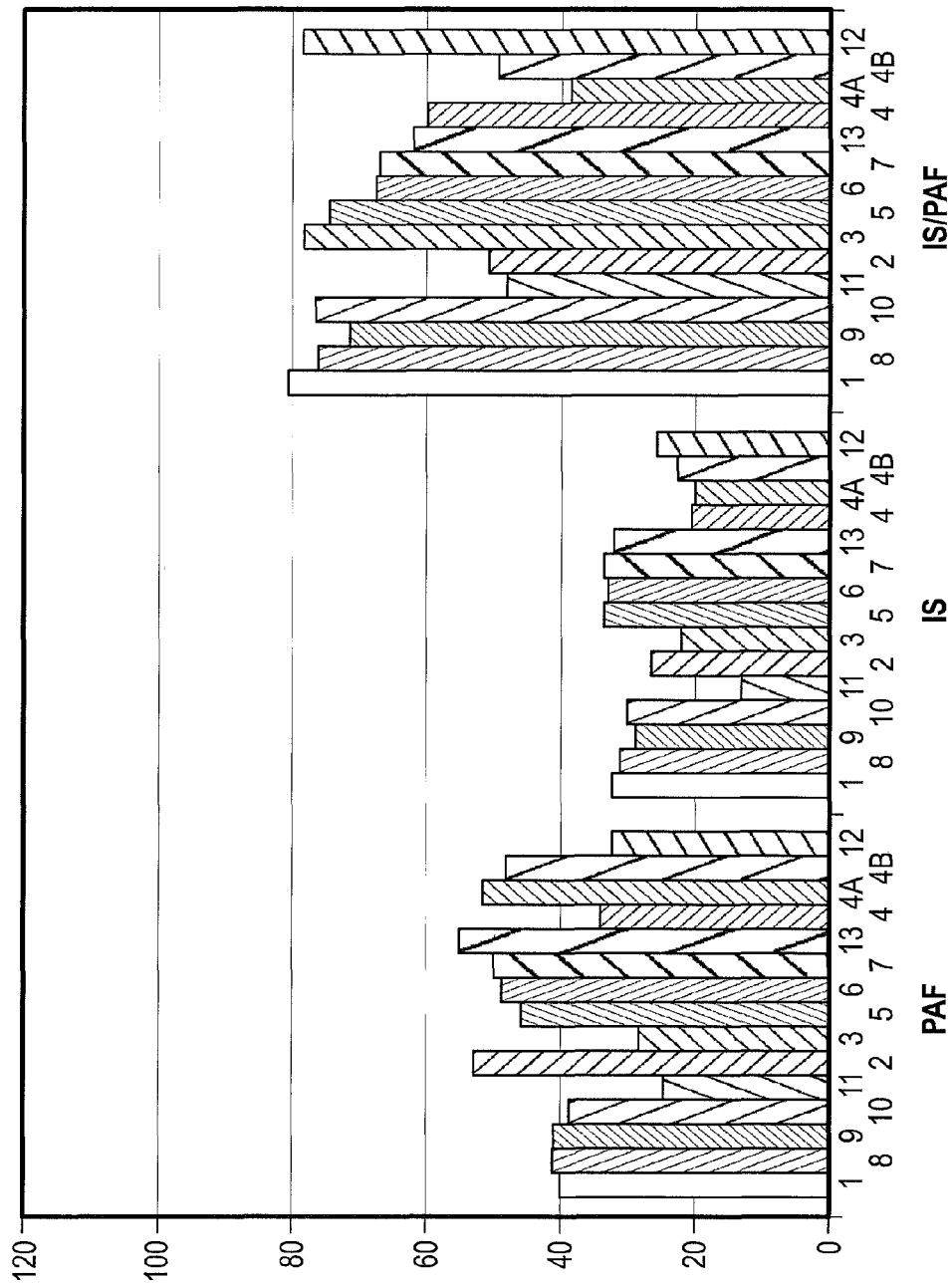
FIG. 13 includes test results for Peak Assembly Force (PAF), Initial Slip (IS), and ratio of IS/PAF for various tolerance rings.

FIG. 13 depicts the test results of PAF, IS, and IS/PAF testing for various tolerance ring. In FIG. 13, the columns have the same designations as in FIGS. 11A, 11B, and 12. PAF and IS are in lbf and IS/PAF is in %

The lasers and the force transducer of the hammer are coupled to a microprocessor and provide inputs to the microprocessor. The microprocessor includes software that calculates resonant frequencies from the inputs provided by the hammer and the lasers. The resonant frequency is directly related to the axial stiffness of the tolerance ring. The resonant frequency measured along an axis that bisects the gap and passes through a center of the assembly is about 9.8 kHz. The resonant frequency measured along an axis perpendicular to the first axis is about 10.1 kHz which is a difference of about 3.2%. As such, the axial stiffness through the gap, $AS_G$, is about 96.8% of the axial stiffness perpendicular to the gap, $AS_{PG}$.

The tolerance rings described herein include slots formed in the sidewall. The slots can provide a tolerance ring having a resonant frequency and stiffness that do not substantially vary circumferentially around the tolerance ring. As such, the tolerance ring can maintain the post in alignment within the bore and can substantially prevent any rocking of the post within the bore under normal operational loads in nearly any radial direction.

A skilled artisan can recognize that there may be others applications that can utilize a tolerance ring having one or more of the characteristics described herein.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A tolerance ring comprising:
a generally cylindrical body having a sidewall including a first hemisphere and a second hemisphere, wherein the sidewall includes:
an unformed section; and
a plurality of wave structures extending from the unformed section;
wherein the unformed section includes:
a first unformed section between a first pair of circumferentially adjacent wave structures in the first hemisphere, the first unformed section including a gap, wherein the gap extends along an entire length, L, of the body to establish a split in the body, and wherein the gap bisects the first hemisphere, and
a second unformed section between a second pair of circumferentially adjacent wave structures non-consecutive with said gap in the first hemisphere, the second unformed section including at least one slot having an axial length, wherein the at least one slot is disposed entirely between the second pair of adjacent wave structures in a circumferential direction, and
wherein the plurality of wave structures are disposed in a plurality of axially extending columns, and wherein a number of the plurality of wave structures in each axially extending column is different than a number of the at least one slot in the axial direction.

2. The tolerance ring of claim 1, wherein the unformed section further comprises a third unformed section between a third pair of circumferentially adjacent wave structures in the first hemisphere, wherein the first unformed section is disposed between the second and third unformed sections, and wherein the third unformed section includes the at least one slot.

3. The tolerance ring of claim 1, wherein the number of the at least one slots in the axial direction is less than the number of wave structure in the second pair of circumferentially adjacent wave structures.

4. The tolerance ring of claim 1, wherein a solid unformed section without a slot includes a circumferential wave-to-wave force transfer, FT, and the second unformed section with the at least one slot includes a circumferential wave-to-wave force transfer, $FT_S$, ≤50% FT.

5. The tolerance ring of claim 1, wherein the at least one slot has a closed periphery defined entirely by the second unformed section.

6. The tolerance ring of claim 1, wherein each unformed section has a width, $W_{US}$, each at least one slot has a width, $W_S$, and $W_S$≥50% $W_{US}$.

7. The tolerance ring of claim 6, wherein $W_{US}$≤99% $W_{US}$.

8. The tolerance ring of claim 1, wherein each wave structure has a length, $L_{WS}$, and wherein the axial length of the at least one slot is at least 50% $L_{WS}$.

9. The tolerance ring of claim 8, wherein the axial length of the at one slot is no grater than 110% $L_{WS}$.

10. The tolerance ring of claim 1, wherein the at least one slot is centered within the second unformed section.

11. The tolerance ring of claim 1, wherein each axially extending column of wave structures comprises at least three wave structures.

12. The tolerance ring of claim 1, wherein the at least one slot comprises one slot.

13. The tolerance ring of claim 1, wherein all of the wave structures in each axially extending column of wave structures are the same size as compared to one another.

14. The tolerance ring of claim 1, wherein the plurality of wave structures are uniformly spaced apart around a circumference of the sidewall.

15. The tolerance ring of claim 1, wherein all of the wave structures in each axially extending column of wave structures have the same length as compared to one another.

16. The tolerance ring of claim 1, wherein the at least one slot comprises a length, $L_S$, and a width, $W_S$, and $L_S$:$W_S$≥10:1.

17. The tolerance ring of claim 16, wherein $L_S$:$W_S$≤50:1.

18. An assembly, comprising:
an outer component including a bore within the outer component;
an inner component disposed within the bore; and
a tolerance ring disposed between the inner and outer components, the tolerance ring comprising:
a generally cylindrical body having a sidewall, wherein the sidewall includes:
an unformed section; and
a plurality of wave structures extending from the unformed section,
wherein the unformed section includes:
a first unformed section between a first pair of circumferentially adjacent wave structures, the first unformed section including a gap, wherein the gap extends along an entire length, L, of the body to establish a split in the body; and
a second unformed section between each remaining pair of circumferentially adjacent wave structures non-consecutive with said gap, the second unformed section including at least one slot therein having an axial length, wherein the at least one slot has a closed periphery defined entirely by the second unformed section, and
wherein the plurality of wave structures extend in a plurality of axially extending columns, and wherein a number of the plurality of wave structures in each axially extending column is different than a number of the at least one slot in the axial direction.

19. A hard disk drive, comprising:
an actuator arm formed with a bore;
a pivot assembly installed within the bore of the actuator the arm, the pivot assembly including a post and a tolerance ring around the post, wherein the tolerance ring includes:
a generally cylindrical body having a sidewall including a first hemisphere and a second hemisphere, wherein the sidewall includes:
an unformed section; and
a plurality of wave structures extending from the unformed section,
wherein the unformed section includes:
a first unformed section between a first pair of circumferentially adjacent wave structures in the first hemisphere, the first unformed section including a gap, wherein the gap extends along an entire length, L, of the body to establish a split in the body, and wherein the gap bisects the first hemisphere, and
a second unformed section between a second pair of circumferentially adjacent wave structures non-consecutive with said gap in the first hemisphere, the second unformed section including at least one slot having an axial length, and wherein the circumferential sides of the slot are defined by the second unformed section, and
wherein the plurality of wave structures extend in a plurality of axially extending columns, and wherein a number of the plurality of wave structures in each axially extending column is different than a number of the at least one slot in the axial direction.

* * * * *